(No Model.)

R. M. DURHAM.
THIMBLE.

No. 495,790. Patented Apr. 18, 1893.

Witnesses.
G. W. Rea.
Robert Errett.

Inventor
Rosina M. Durham.
By
James L. Norris.
Atty.

UNITED STATES PATENT OFFICE.

ROSINA M. DURHAM, OF NEW BARNET, ENGLAND.

THIMBLE.

SPECIFICATION forming part of Letters Patent No. 495,790, dated April 18, 1893.

Application filed December 6, 1892. Serial No. 454,284. (No model.) Patented in England July 26, 1892, No. 13,603, and in France November 30, 1892, No. 226,037.

*To all whom it may concern:*

Be it known that I, ROSINA MARGERY DURHAM, a citizen of England, residing at Glemham Lodge, New Barnet, in the county of Hertford, England, have invented a new and useful Improvement in Thimbles, (for which I have obtained Letters Patent in Great Britain, dated July 26, 1892, No. 13,603, and in France, dated November 30, 1892, No. 226,037,) of which the following is a specification.

My invention relates to a construction of a thimble in such a manner that it can readily be made to fit fingers of different sizes, as I shall describe referring to the accompanying drawings, in which like letters of reference denote corresponding parts.

Figure 1:
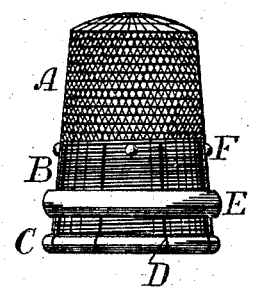
Figure 2:
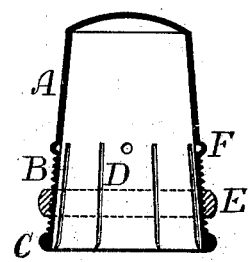

Figure 1 is an external elevation and Fig. 2 is a longitudinal section of a thimble according to my invention both these figures being drawn to an enlarged scale.

The head portion of the thimble A is of the usual construction, but the part B between the head and the lip C has a screw thread cut on it, and this part as well as the lip C is split by a number of cuts, preferably not less than six. An internally threaded ring E is passed over the head A and screwed on the threaded part B, and in order to prevent the ring from being lost, several prominences F are struck up by a tool punching them from inside after the ring has been screwed on. As the part B is taper, this part of the thimble is the more contracted to fit a smaller finger the farther the ring E is screwed toward the lip C. When the thimble is intended to fit fingers within a limited range of variation the ring E, the screwing of the part B and the prominences F may be dispensed with and the thimble being made of elastic material and of such size as to fit a certain finger, will fit fingers somewhat larger by the spring of the metal between the splits D.

Having thus described the nature of this invention and the best means I know of carrying the same into practical effect, I claim—

1. As an improved article of manufacture, a sewing thimble comprising a lip, a head portion, and a tapering body, and provided with a series of splits D extending through the lip toward the head portion for the purpose of adapting the thimble to fingers of varying sizes, substantially as described.

2. In combination with a thimble having its lip and the taper part between the lip and the head portion split by a number of cuts and having the said taper part screw threaded, an internally threaded ring screwed thereon so as more or less to contract it causing it to fit fingers of various sizes, substantially as described.

In testimony whereof I have signed my name to this specification, in the presence of two subscribing witnesses, this 23d day of November, A. D. 1892.

ROSINA M. DURHAM.

Witnesses:
   E. A. PORTER,
   HAROLD IMRAY.